(12) United States Patent
Zhang

(10) Patent No.: US 7,212,012 B1
(45) Date of Patent: May 1, 2007

(54) METHOD OF AND SYSTEM FOR REGULATING OUTPUT VOLTAGE

(75) Inventor: Jindong Zhang, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 208 days.

(21) Appl. No.: 11/012,179

(22) Filed: Dec. 16, 2004

(51) Int. Cl.
*G01R 27/02* (2006.01)
*G05F 1/00* (2006.01)
*H02M 5/40* (2006.01)

(52) U.S. Cl. .................... 324/611; 323/285; 363/34
(58) Field of Classification Search ............ 324/611, 324/609, 602, 600, 691, 658, 686; 323/234; 363/21.01, 28, 75, 76, 78, 79
See application file for complete search history.

(56) References Cited

U.S. PATENT DOCUMENTS

| | | | | |
|---|---|---|---|---|
| 4,532,582 A * | 7/1985 | Freeny, Jr. | ..................... | 363/90 |
| 5,448,155 A * | 9/1995 | Jutras | ........................... | 323/285 |
| 6,094,367 A * | 7/2000 | Hsu et al. | ...................... | 363/78 |
| 6,661,210 B2 * | 12/2003 | Kimball et al. | .............. | 323/268 |
| 6,694,438 B1 * | 2/2004 | Porter et al. | ................. | 713/300 |
| 7,007,176 B2 * | 2/2006 | Goodfellow et al. | ......... | 713/300 |

* cited by examiner

*Primary Examiner*—Andrew H. Hirshfeld
*Assistant Examiner*—Hoai-An D. Nguyen
(74) *Attorney, Agent, or Firm*—McDermott Will & Emery LLP

(57) ABSTRACT

A method of and system for regulating voltage supplied by a local power supply to a remote load includes sensing a low frequency portion of the output voltage at the remote load, locally sensing a high frequency portion of the output voltage produced by the local power supply, and in response, controlling the output of the supply.

21 Claims, 4 Drawing Sheets

METHOD OF AND SYSTEM FOR REGULATING OUTPUT VOLTAGE

TECHNICAL FIELD

This disclosure relates to sensing an output voltage of a DC power supply and, more particularly, to implementing novel feedback to regulate a DC power supply.

BACKGROUND

With an evolving need for faster computer systems, DC power supplies are employed to supply computer system components (e.g., processors, memory chips, etc.) with more current at decreased voltage levels for higher component operating speeds. In such low voltage/high current applications, voltage drops experienced between the power supply and the components, once deemed tolerable, are becoming problematic. For example, voltage drops due to parasitic impedance present in printed circuit board (PCB) traces and conductor interconnect points are no longer acceptable.

In addition, parasitic impedance may also affect the feedback system(s) used to regulate the power supply voltage. For example, by causing higher frequency content of the supply voltage to be filtered, additional phase delay may be introduced that reduces the stability of the feedback system and the accuracy of the output voltage being supplied to the computer system components (or other types of loads).

SUMMARY

In accordance with an aspect of the disclosure, a DC power supply includes a power converter for supplying a voltage to a remote load, and a regulator coupled to the power converter and configured for receiving a low frequency component of the output voltage at a vicinity of the load. The regulator receives a local higher frequency component of the output voltage at the power converter and processes the received low and higher frequency voltage components to regulate the voltage supplied to the load.

In one embodiment of the DC power supply, the regulator may be coupled to one signal flow path for sensing the local higher frequency component of the output voltage, and to another signal flow path for sensing the low frequency component of the output voltage at the vicinity of the load. The signal flow path for sensing the local higher frequency component may include a capacitor, and the signal flow path for sensing the low frequency component may include a resistor.

In accordance with another aspect of the disclosure, the high frequency signal flow path may include a resistor and a capacitor connected in parallel, and the lower frequency signal flow path may include a resistor.

In one embodiment, the resistance of the resistor in the lower frequency signal flow path may be less than the resistance of the resistor connected in parallel to the capacitor in the higher frequency signal flow path. The impedance of the capacitor at a particular frequency may be less than the resistance of the resistor in the low frequency signal flow path.

In accordance with another aspect of the disclosure, a method of controlling a DC power supply for supplying voltage to a load includes sensing a remote low frequency parameter associated with the load and sensing a local higher frequency load parameter of the supply. The output of the power supply is regulated in response to the sensed low frequency and higher frequency load parameters.

In a preferred embodiment, the sensed low frequency load parameter may include a DC component and the local higher frequency parameter may be an AC parameter.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE PREFERRED EMBODIMENTS

Figure 1:
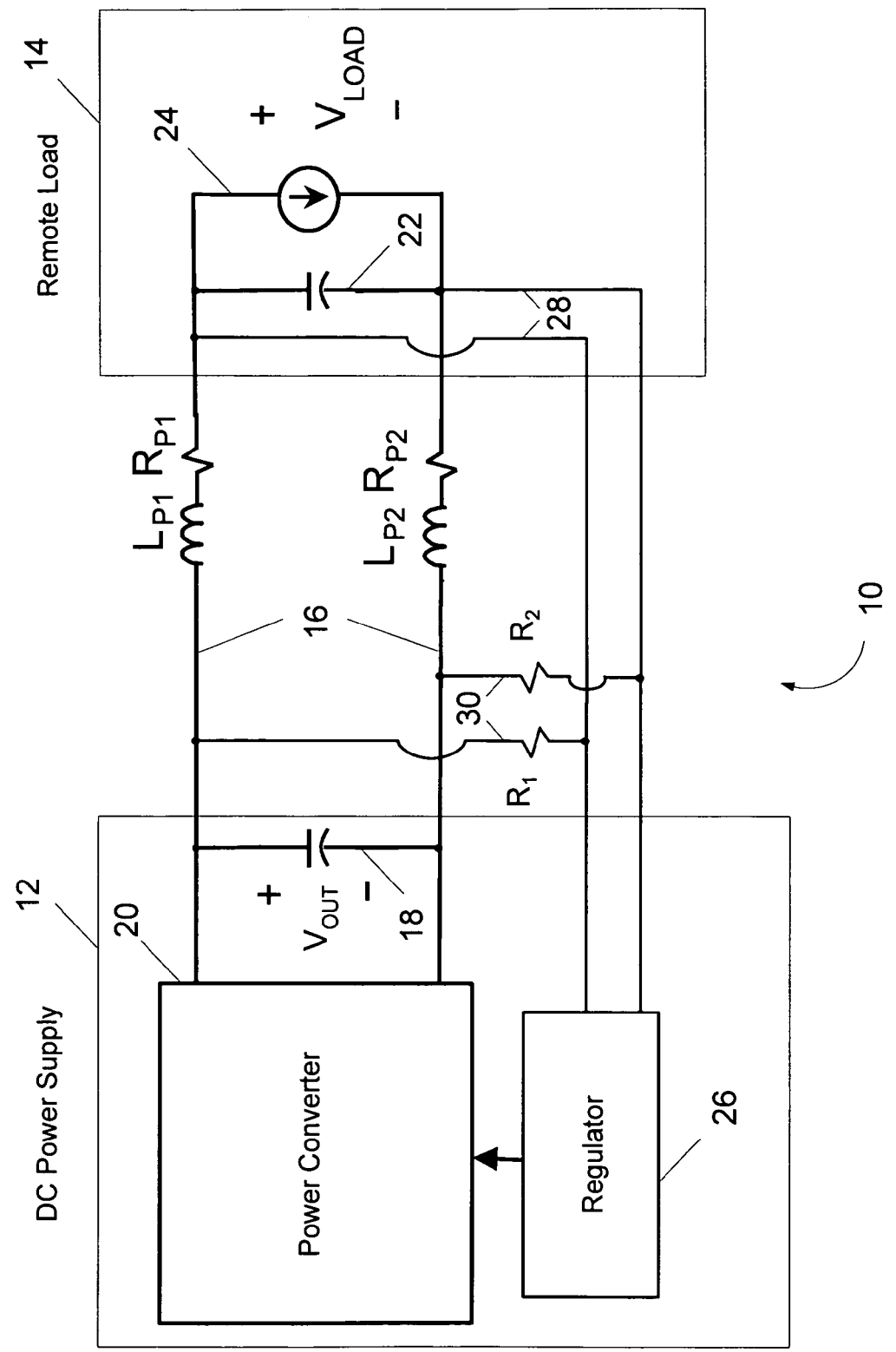
FIG. 1 is a diagrammatic view of a conventional feedback system for monitoring supply voltage.

Referring to FIG. 1, a conventional feedback system 10 is used to monitor voltage supplied by a DC power supply 12 to a remote load 14 (e.g., microprocessor, memory chip, etc.). A pair of printed circuit board (PCB) conductors 16 (e.g., wires, traces, etc.) is connected across an output capacitor 18 of a power converter 20 included in power supply 12. Conductor pair 16 extends and is connected across remote load 14, which in this example is a capacitor 22 and a current source 24 (e.g., to model a microprocessor).

To regulate the output voltage of DC power supply 12, a regulator 26 monitors the output voltage ($V_{OUT}$) of the supply and the load voltage ($V_{LOAD}$) present at load 14 to be fed back to the regulator on lines 28 and 30 as feedback information. By sensing these voltages, regulator 26 can use this feedback information to initiate adjustments to power converter 20 so as to compensate for the voltage drops due to losses in conductor pair 16. Similarly, a pair of conductors 30 with resistors $R_1$, $R_2$ is connected across output capacitor 18 to provide $V_{OUT}$ to regulator 26, obtained locally.

As current flows from DC power supply 12 to remote load 14 to deliver $V_{OUT}$, voltage drops may be experienced on conductor pair 16 due to parasitic impedances associated with the conductors. These parasitic impedances may be caused, e.g., by the material properties of the conductors, the physical geometry of each conductor, and/or the layout of the conductors. Furthermore, due to interconnection points along conductor pair 16 to other systems or components (between DC power supply 12 and remote load 14), additional parasitic impedances may be introduced that produce additional voltage drops. To represent the parasitic impedances associated with conductor pair 16, each conductor is shown to include an equivalent parasitic inductance (i.e., $L_{P1}$ and $L_{P2}$) and an equivalent parasitic resistance (i.e., $R_{P1}$ and $R_{P2}$).

Along with producing voltage drops along conductor pair 16, parasitic impedances may alter the spectral content of $V_{OUT}$. Thus, the spectral content of $V_{LOAD}$ may differ from the spectral content of $V_{OUT}$. In particular, the spectral content of $V_{OUT}$ may be filtered by the combination of the parasitic impedances and load capacitor 22. By connecting $L_{P1}$ and $R_{P1}$ (and $L_{P2}$ and $R_{P2}$) to load capacitor 22, a low pass filter is produced that attenuates the higher frequency content of $V_{LOAD}$ (with respect to higher frequency content of $V_{OUT}$).

By reducing the high frequency content of $V_{LOAD}$, additional phase delay is introduced into feedback system 10 by the signals that propagate from remote load 14 to regulator 26 (via conductor pair 28). Due to this additional phase delay, the stability of feedback system 10 may be reduced along with the accuracy of DC power supply 12.

Figure 2:
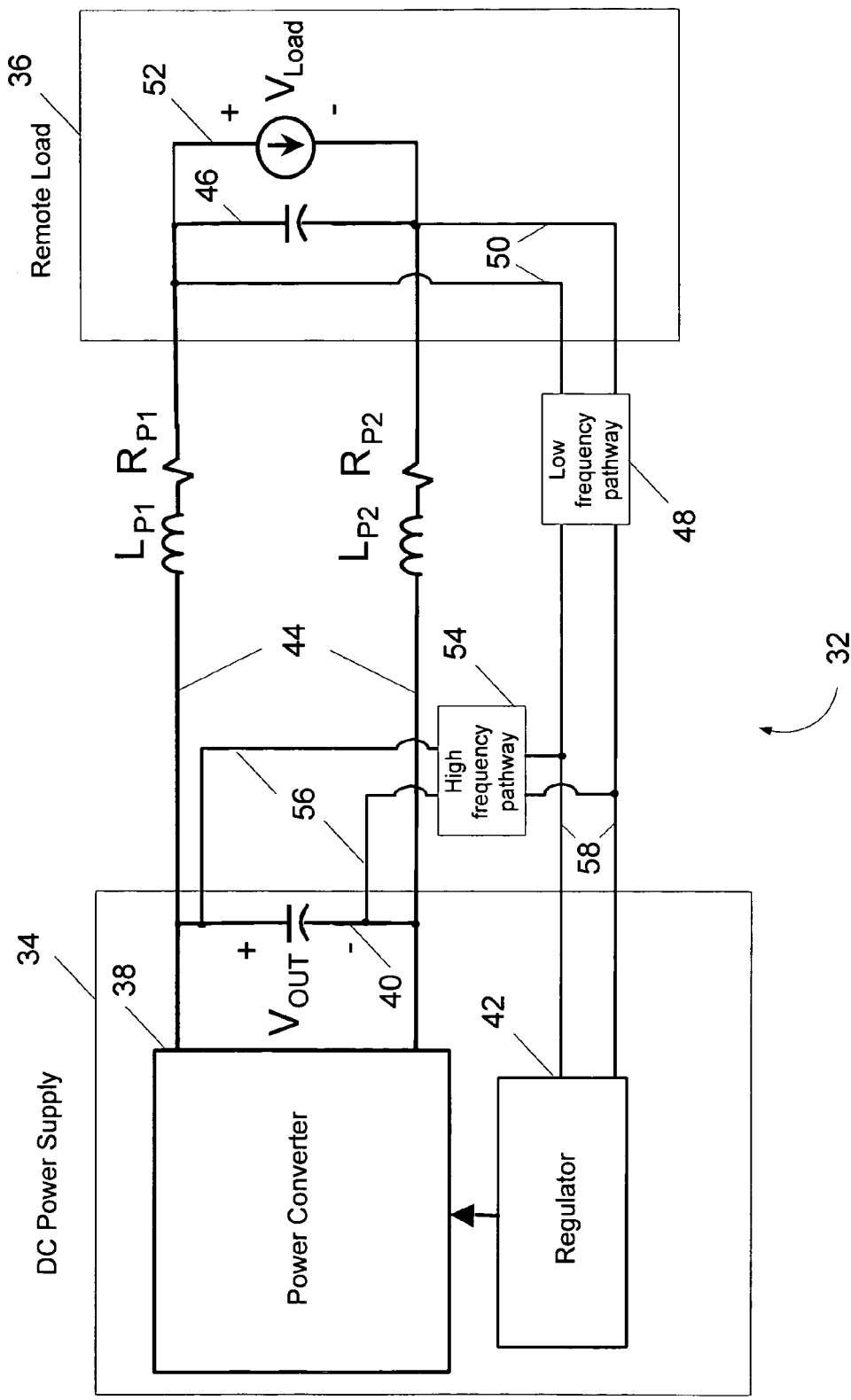
FIG. 2 is a diagrammatic view of a frequency selective feedback system for monitoring supply voltage.

Referring to FIG. 2, to increase stability and accuracy, a frequency selective feedback system 32, as described herein senses separately the higher frequency content of an output voltage ($V_{OUT}$) of a DC power supply 34 and the lower frequency content of the voltage ($V_{LOAD}$) present at a remote load 36. As will be described in greater detail below, by sensing the low frequency content of $V_{LOAD}$ (and not the higher frequency content $V_{LOAD}$) at load 36, the effects of parasitic impedances present between DC power supply 34 and load 36 are substantially reduced.

Similar to feedback system 10 shown in FIG. 1, DC power supply 34 includes a power converter 38 that provides $V_{OUT}$ to an output capacitor 40. A regulator 42 initiates adjustments to $V_{OUT}$ by receiving feedback signals from the output of DC power supply 34 and remote load 36. A pair of conductors 44 extend between DC power supply 34 and remote load 36. Parasitic impedances are present in conductor pair 44 due to the material and geometry of the conductors and interconnections along the conductors. Equivalent parasitic inductances ($L_{P1}$ and $L_{P2}$) and equivalent parasitic resistances ($R_{P1}$ and $R_{P2}$) in combination with a load capacitor 46, filter the high frequency components of the voltage delivered to remote load 36. Due to this filtering, the higher frequency content of $V_{LOAD}$ is attenuated (with respect to $V_{OUT}$). However, by sensing only the low frequency portion of $V_{LOAD}$, phase delay introduced by this filtering is substantially suppressed from the feedback signal provided to regulator 42.

To provide a feedback signal from remote load 36 to regulator 42, frequency selective feedback system 32 includes a low frequency signal flow path 48 that senses the low frequency content of $V_{LOAD}$. To sense $V_{LOAD}$, a pair of conductors 50 connects low frequency signal flow path 48 across load capacitor 46 (and a current source 52, which with load capacitor 46 represents a microprocessor). To provide the high frequency content of $V_{OUT}$, feedback system 32 includes a high frequency pathway 54 that provides a feedback signal to regulator 42. By providing only the high frequency content of $V_{OUT}$ (rather than the high frequency content of $V_{LOAD}$), the filtering effect of the parasitic impedances (i.e., $L_{P1}$, $L_{P2}$, $R_{P1}$ and $R_{P2}$) is substantially reduced. To sense the high frequency content of $V_{OUT}$, a pair of conductors 56 is connected across output capacitor 40 to high frequency signal pathway 54. The high frequency content (along with the low frequency content) is sent over a pair of conductors 58 to regulator 42 for adjusting power converter 38.

While the terms "low frequency" and "high frequency" are relative and without distinct boundaries, in some arrangements, the high and low frequency signal flow paths 48, 54 may be designed so that particular frequency components are included in the low frequency content and/or the high frequency content. For example, low frequency signal flow path 48 may be designed so that the low frequency content of $V_{LOAD}$ includes the zero frequency component (DC) of $V_{LOAD}$. Correspondingly, the high frequency content comprises AC components of $V_{OUT}$. In such an arrangement, by coupling the DC component of $V_{LOAD}$ to low frequency signal flow path 48 and the AC components of $V_{OUT}$ to high frequency signal flow path 54, phase delay due to parasitic impedances is suppressed, enhancing stability of selective feedback system 32 (with respect to the stability of feedback system 10).

Figure 3:
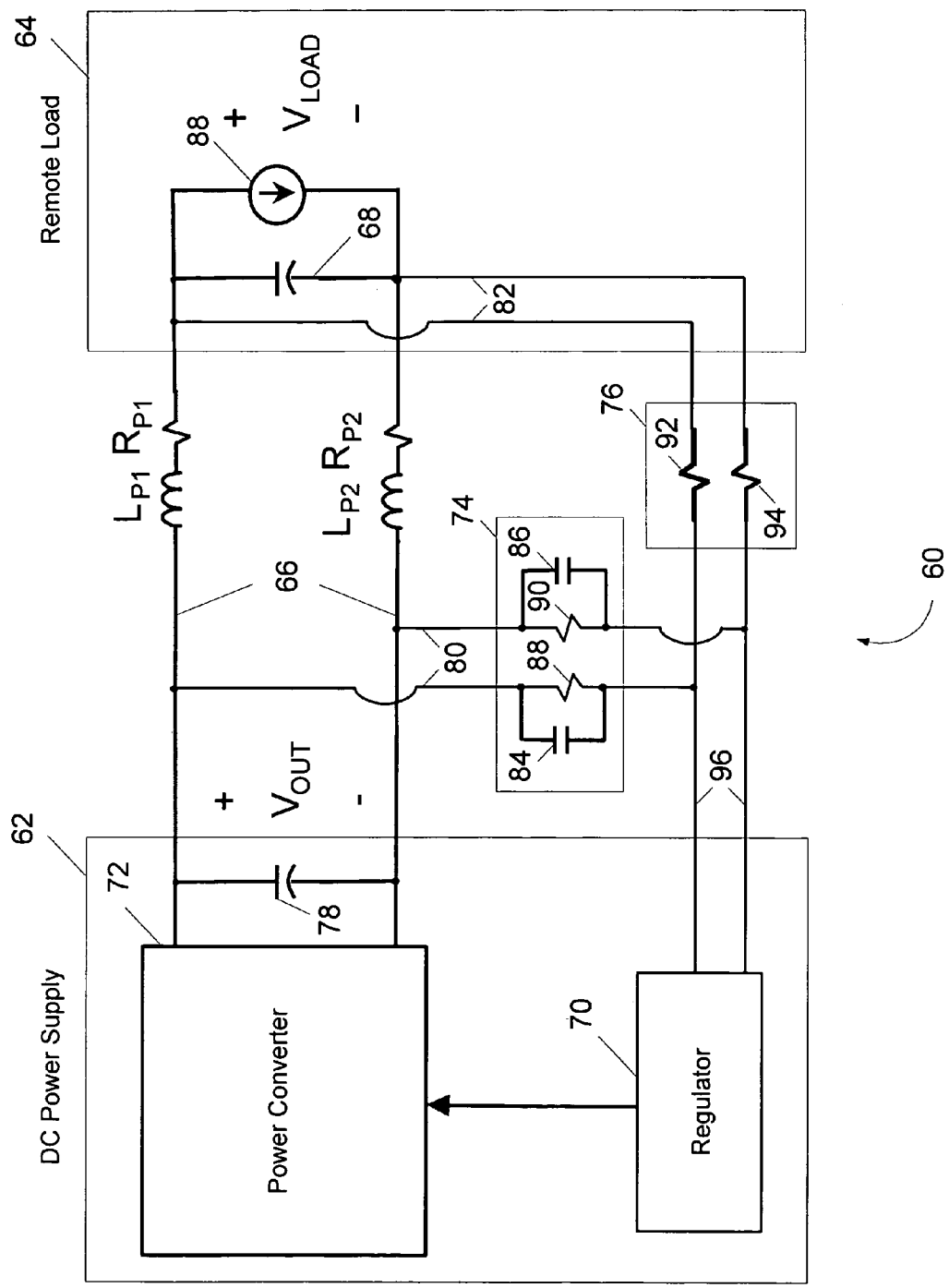
FIG. 3 is a diagrammatic view of one example of a circuit that implements the functionality of the frequency selective feedback system of FIG. 2.

Referring to FIG. 3, an exemplary frequency selective feedback system 60 includes a circuit for sensing low frequency components of $V_{LOAD}$ (e.g., is supplied by DC power supply 62 to remote load 64). In this example the low frequency components of $V_{LOAD}$ include the DC component of $V_{LOAD}$. Additionally, other DC load parameters may be included in the low frequency components of $V_{LOAD}$. For example, a range of frequency components near DC component may be included in the low frequency components. Frequency selective feedback system 60 also includes circuitry that senses and provides higher frequency components of $V_{OUT}$ to a regulator 70. These higher frequency components are sensed prior to being affected by parasitic impedances (i.e., $L_{P1}$, $L_{P2}$, $R_{P1}$ and $L_{P2}$) present in a pair of conductors 66 that extends from DC power supply 62 to remote load 64. The high frequency components do not include DC. By sensing the higher frequency components at a point in the load circuit prior to the region in which the effects of the parasitic impedances (in combination with a load capacitor 68) emerge, stability of feedback system 60 improves. Correspondingly, adjustments initiated by a regulator 70 to a power converter 72 (in DC power supply 62) may be more accurate.

A high frequency signal flow path 74 provides the AC portion of $V_{OUT}$, and a low frequency signal flow path 76 correspondingly provides the DC portion of $V_{LOAD}$. Similar to high frequency signal flow path 54 shown in FIG. 2, to sense $V_{OUT}$, a pair of conductors 80 connects high frequency signal flow path 74 across an output capacitor 78 in DC power supply 62. Low frequency signal flow path 76 (similar to low frequency path 48) is connected across load capacitor 68 (and a current source 88) by a pair of conductors 82 for sensing the AC portion of $V_{LOAD}$. In this example, to provide the AC portion of $V_{OUT}$, high frequency signal flow path 74 includes a pair of capacitors 84, 86 that are respectively connected in parallel with a pair of resistors 88, 90. To provide the DC portion of $V_{LOAD}$, low frequency signal flow path 76 includes resistors 92, 94 that are respectively connected by a pair of conductors 82 to the terminals of capacitor 68.

By selecting the appropriate resistance values for resistors 88, 90, 92, 94 and capacitance values for capacitors 84 and 86, the appropriate DC portion of $V_{LOAD}$ and AC portion of $V_{OUT}$ are provided to regulator 70 for adjusting power converter 72. In one example, resistance values for resistors 92 and 94 are selected to have a significantly lower resistance than resistors 88 and 90. Due to this lower resistance, the DC portion of $V_{LOAD}$ is provided to regulator 70 through a pair of conductors 96 connected to resistors 92 and 94. Similarly, the capacitance values of capacitors 84 and 86 are selected to pass the AC portion of $V_{OUT}$. For example, the capacitance values may be selected such that the impedances of capacitors 84 and 86 are significantly lower than the resistances of resistors 92 and 94 (at or near frequencies that define the AC portion of $V_{OUT}$). Accordingly, the AC portion of $V_{OUT}$ is provided to regulator 70 and the AC portion of $V_{LOAD}$ is substantially suppressed. By suppressing the AC portion of $V_{LOAD}$, the effect (e.g., phase delay) of the parasitic impedances is substantially reduced from the signals provided to regulator 70 (via a pair of conductors 96).

To provide an exemplary performance comparison of the traditional feedback system 10 (shown in FIG. 1) and frequency selective feedback system 60 (shown in FIG. 3), the following conditions and component values may be used by both feedback systems:

DC power supplies 12 and 62 input voltage: $12V_{DC}$
Output at loads 14 and 64: $1.5V/60 A_{max}$
Power supplies 12 and 62 parameters: 3-phase LTC3731 step-down supply. Switching frequency=450 kHz.
Capacitors 18 and 78: 4×330 uF/2.5V Sanyo 2R5TPE330MC
Load Capacitors 22 and 68: 30×100 uF/6.3V/X5R ceramic capacitors
Parasitic resistance of $R_{P1}$ and $R_{P2}$: 3.3 milli-Ohm.
Resistors $R_1$ and $R_2$ (shown in FIG. 1): 50 Ohm.
Resistors 92 and 94 (shown in FIG. 3): 10 Ohm.
Resistors 88 and 90 (shown in FIG. 3): 100 Ohm.
Capacitors 84 and 86 (shown in FIG. 3): 10 uF.

Besides the values and conditions provided above, both feedback systems 10 and 60 have identical components and are subjected to the same test conditions for this performance comparison.

Figure 4:
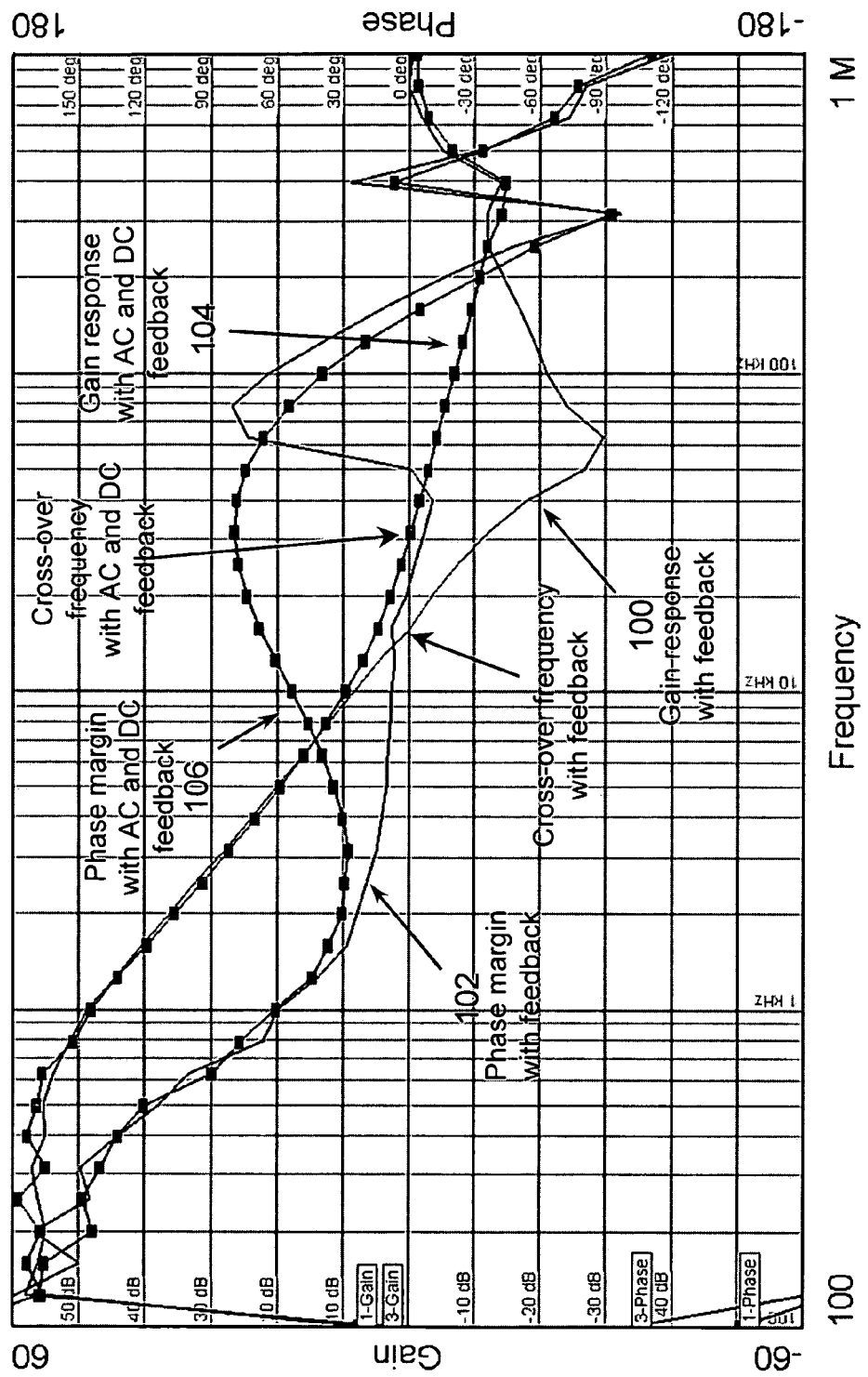
FIG. 4 is a chart representing the performance of the conventional feedback system of FIG. 1 and the frequency selective feedback system of FIG. 2.

Referring to FIG. 4, the chart presents the performance (open loop frequency response) of conventional feedback system 10 (shown in FIG. 1) and frequency selectable feedback system 60 (shown in FIG. 3). The chart displays (y-axis) loop gain, ranging from −60 dB to +60 dB, and phase, ranging from −180° to +180°. Both gain and phase are presented as a function of frequency (x-axis) on a logarithmic scale. Solid lines 100 and 102 represent the loop gain and the phase of conventional feedback system 10 and provide a baseline for comparing the performance of conventional feedback system 10 (with $V_{OUT}$ and $V_{LOAD}$ being provided to regulator 26) and frequency selective feedback system 60 (with the AC portion of $V_{OUT}$ and the DC portion of $V_{LOAD}$ being provided to regulator 70).

Referring to solid line 100 (open loop gain of conventional feedback system 10), one measure for quantifying the gain response is determining the frequency at which the open loop gain has a unity value. This frequency is called the crossover frequency. In this example, the crossover frequency is approximately 15 KHz. Phase margin is used to quantify system stability and provides the amount of phase lag that separates the system from a marginally stable state. Using the open loop frequency response, phase margin may be defined as the difference between the system phase shift at the crossover frequency and −180°. For conventional feedback system 10, the phase at the crossover frequency (i.e., 15 KHz) is approximately 10° and the phase margin is approximately 190°.

Referring to dotted lines 104 and 106, implementing frequency selective feedback system 60, the operational bandwidth and system stability improves in comparison to the conventional feedback system. Dotted lines 104 and 106 respectively represent the gain and phase response of frequency selective feedback system 60 in which the AC portion of $V_{OUT}$ and the DC portion of $V_{LOAD}$ are provided to regulator 70. Due to this feedback scheme, the operational bandwidth of the feedback system increases along with the phase margin (which increases system stability). Referring to dotted line 104, it is apparent that the crossover frequency has increased to 30 KHz. The phase at the crossover frequency (provided by dotted line 106) is approximately 75° and provides a phase margin of approximately 225°. By providing this frequency selective feedback, and reducing the effects of parasitic impedances, system bandwidth is increased along with system stability.

A number of implementations have been described. Nevertheless, it will be understood that various modifications may be made. For example, this feedback scheme may be used to improve stability in other system such as communication systems (e.g., audio/video systems), data processing systems (e.g., data input/output (I/O) systems), and other types of systems with remotely located loads Accordingly, other implementations are within the scope of the following claims.

What is claimed is:

1. A DC power supply, comprising:
   a power converter for supplying a voltage to a load remote from the power supply; and
   a regulator coupled to the power converter and configured for receiving an output voltage from a vicinity of the load, from which a high frequency component of the output voltage being suppressed by a low pass filtering arrangement to supply a low frequency component of the output voltage to the regulator, and a local higher frequency component of the output voltage at the power converter, from which a low frequency component of the output voltage at the regulator has being suppressed by a high pass filtering arrangement, the suppressed low frequency component being at lower frequencies relative to a higher frequency component at the load, and for processing the received low and higher frequency voltage components to regulate the voltage supplied to the load.

2. The DC power supply of claim 1, wherein the regulator is coupled to a first signal flow path for sensing the local higher frequency component of the output voltage and is coupled to a second signal flow path for sensing the low frequency component of the output voltage at the vicinity of the load.

3. The DC power supply of claim 2, wherein the first signal flow path includes a capacitor.

4. The DC power supply of claim 2, wherein the second signal flow path includes a resistor.

5. The DC power supply of claim 4, wherein the resistance of the resistor is less than the resistance of a resistor connected in parallel to the capacitor.

6. The DC power supply of claim 4, wherein the impedance of the capacitor at a particular frequency is less than the resistance of the resistor in the second signal flow path.

7. A DC power supply, comprising:
   a power converter having a local output for supplying a voltage over an interconnection line to a load remote from the power supply; and
   a regulator coupled to the power converter and configured for:
   sensing a DC component of an output voltage at a remote portion of the interconnection line, a high frequency component of the output voltage at the remote portion being suppressed by a low pass filtering arrangement to prevent the regulator from sensing the high frequency component;
   sensing an AC component of the output voltage at a local portion of the interconnection line, a low frequency component of the output voltage at the local portion being suppressed by a high pass filtering arrangement to prevent the regulator from sensing the low frequency component; and processing the sensed DC and AC components to regulate the voltage supplied to the load.

8. The DC power supply of claim 7, wherein a capacitive element connects the regulator to the interconnection line to sense the AC component of the output voltage.

9. The DC power supply of claim 8, wherein a resistive element connects the regulator to the interconnection line to sense the DC component of the output voltage.

10. The DC power supply of claim 9, wherein the resistance of the resistive element is less than the resistance of a resistive element connected in parallel to the capacitive element.

11. The DC power supply of claim 9, wherein the impedance of the capacitive element at a crossover frequency is less than the resistance of the resistive element that connects to the interconnection line to sense the DC component of the output voltage.

12. A system for monitoring output voltage of a power supply, comprising:
    a first signal flow path for sensing a high frequency portion of the output voltage at an output of the power supply, a low frequency component of the output voltage at the output of the power supply being suppressed by a high pass filtering arrangement to prevent sensing of the low frequency component, wherein the first signal flow path includes a resistor and a capacitor connected in parallel; and
    a second signal flow path for sensing a lower frequency portion of the output voltage at a remote load, a high frequency component of the output voltage at the remote load being suppressed by a low pass filtering arrangement to prevent sensing the high frequency component, which is at higher frequencies than the low frequency component, wherein the second signal flow path includes a resistor.

13. The system of claim 12, wherein the resistance of the resistor in the second signal flow path is less than the resistance of the resistor connected in parallel to the capacitor in the first signal flow path.

14. The system of claim 12, wherein the impedance of the capacitor at a particular frequency is less than the resistance of the resistor in the second signal flow path.

15. A method of controlling a DC power supply for supplying voltage to a load, comprising the steps of:
    sensing a remote low frequency parameter associated with the load, a high frequency component of the parameter associated with the load being suppressed by a low pass filtering arrangement to prevent sensing the high frequency component;
    sensing a local higher frequency load parameter, a low frequency component of the local load parameter being suppressed by a high pass filtering arrangement to prevent sensing the low frequency component, the low frequency component being at lower frequencies than the high frequency component; and
    regulating an output of the power supply in response to the sensed low frequency and higher frequency load parameters.

16. The method of claim 15, wherein the sensed remote low frequency parameter includes a DC component and the sensed local higher frequency load parameter is an AC parameter.

17. The method of claim 15, wherein sensing the remote low frequency parameter includes passing the low frequency parameter through a resistor.

18. The method of claim 17, wherein sensing the local higher frequency load parameter includes passing the local higher frequency load parameter through a capacitor.

19. The method of claim 18, wherein the resistance of the resistor that passes the low frequency parameter is less than the resistance of a resistor connected in parallel to the capacitor.

20. The method of claim 18, wherein the impedance of the capacitor at a particular frequency is less than the resistance of the resistor that passes the remote low frequency parameter.

21. The method of claim 15, further comprising the step of:
    combining the sensed low frequency parameter and the sensed higher frequency load parameter.

* * * * *